US006898573B1

(12) United States Patent
Piehl

(10) Patent No.: US 6,898,573 B1
(45) Date of Patent: May 24, 2005

(54) TAX ESCROW SYSTEM FOR INDEPENDENT CONTRACTORS

(76) Inventor: Violet M. Piehl, 5371 Merrick Ave., Dearborn Heights, MI (US) 48125

( * ) Notice: Subject to any disclaimer, the term of this patent is extended or adjusted under 35 U.S.C. 154(b) by 647 days.

(21) Appl. No.: 09/671,010

(22) Filed: Sep. 27, 2000

(51) Int. Cl.[7] .............................................. G06F 17/60
(52) U.S. Cl. .......................................... 705/31; 705/30
(58) Field of Search ............................. 705/30, 31, 26, 705/1, 32, 78, 9

(56) References Cited

U.S. PATENT DOCUMENTS 5,875,435 A * 2/1999 Brown ......................... 705/30

FOREIGN PATENT DOCUMENTS

WO    WO 01/25987 A1 * 4/2001    ........... G06F/17/60

OTHER PUBLICATIONS

Internet Publication to NICS. Newsletter—vol. VI—Aug. 2000. Archived on www.archive.org on Aug. 24, 2000. pp. 1–5.*

TurboTax Publication Tax Year 1997. Intuit. Oct. 1997.*

Internet Publication to IContract (www.icontract.com). Archived on Oct. 14, 1997. Available online (www.archive.org). pp. 1–17.*

Stern, Linda. Unmask the hidden costs of self employment. Home Office Computing, v10, n6, p62 (4). Jun. 1992.*

* cited by examiner

Primary Examiner—James S. McClellan
(74) Attorney, Agent, or Firm—Gerald R. Black

(57) ABSTRACT

The system ensures the timely payment of taxes due a taxing authority while protecting the solvency of an independent service provider. The contracting entity retains a third-party escrow manager who oversees payments made by the contracting entity to an independent service provider. The third-party escrow manager estimates tax liability owed by the independent service provider to a tax authority based upon data provided to the third-party escrow manager by the independent service provider. The third-party escrow manager deposits a portion of monies owed to the independent service provider by the contracting entity for services provided in an escrow account. The escrow account is used by the independent contractor to pay monies owed to the taxing authority in a timely manner when due.

2 Claims, 25 Drawing Sheets

System Procedure Flow Chart

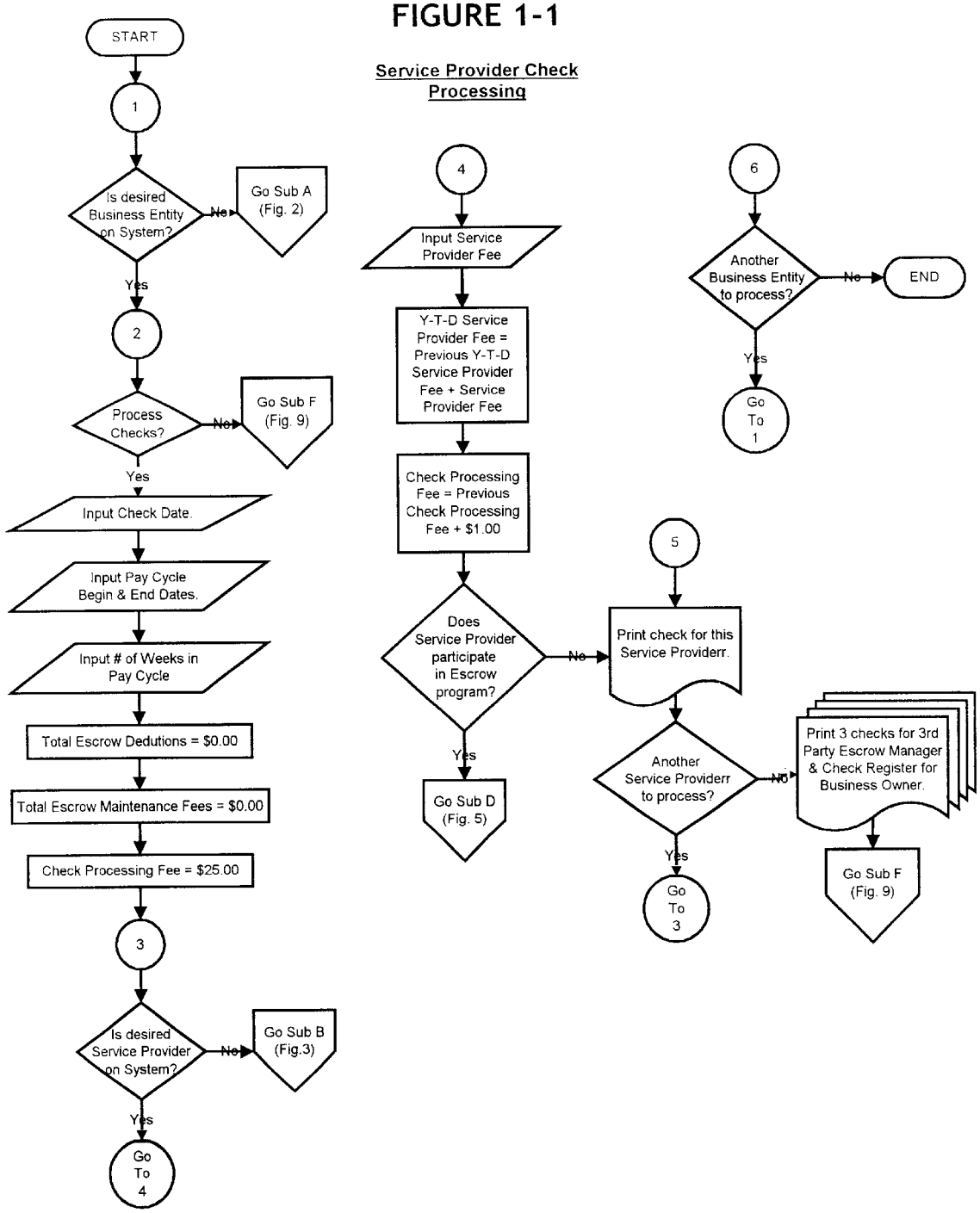

Software Program Flow Chart

SUB A:
SET UP BUSINESS ENTITY

Software Program Flow Chart

SUB B:
SET UP SERVICE PROVIDER

Software Program Flow Chart

SUB C:
SET UP PARTICIPATING SERVICE PROVIDER HISTORY

Software Program Flow Chart

SUB D:
COMPUTE TAX ESCROW DEDUCTION FOR
PARTICIPATING SERVICE PROVIDER

Software Program Flow Chart

SUB D (continued):
COMPUTE TAX ESCROW DEDUCTION FOR
PARTICIPATING SERVICE PROVIDER

Software Program Flow Chart

SUB D (continued):
COMPUTE TAX ESCROW DEDUCTION FOR
PARTICIPATING SERVICE PROVIDER

Software Program Flow Chart

SUB E:
COMPUTE ANNUALIZED CITY INCOME TAX FOR PARTICIPATING SERVICE PROVIDER SUBJECT TO CITY TAX

Software Program Flow Chart

SUB F:
OTHER PROCEDURES

Software Program Flow Chart

SUB G:
QUARTER-END PROCEDURES

Quarterly Estimated Tax Payment Due Dates:
April 15 y1, June 15 y1, September 15 y1, & January 15 y2.

Software Program Flow Chart

**SUB H:
YEAR-END PROCEDURES**

WORK FLOW DIAGRAM

WORK FLOW DIAGRAM

WORK FLOW DIAGRAM

WORK FLOW DIAGRAM

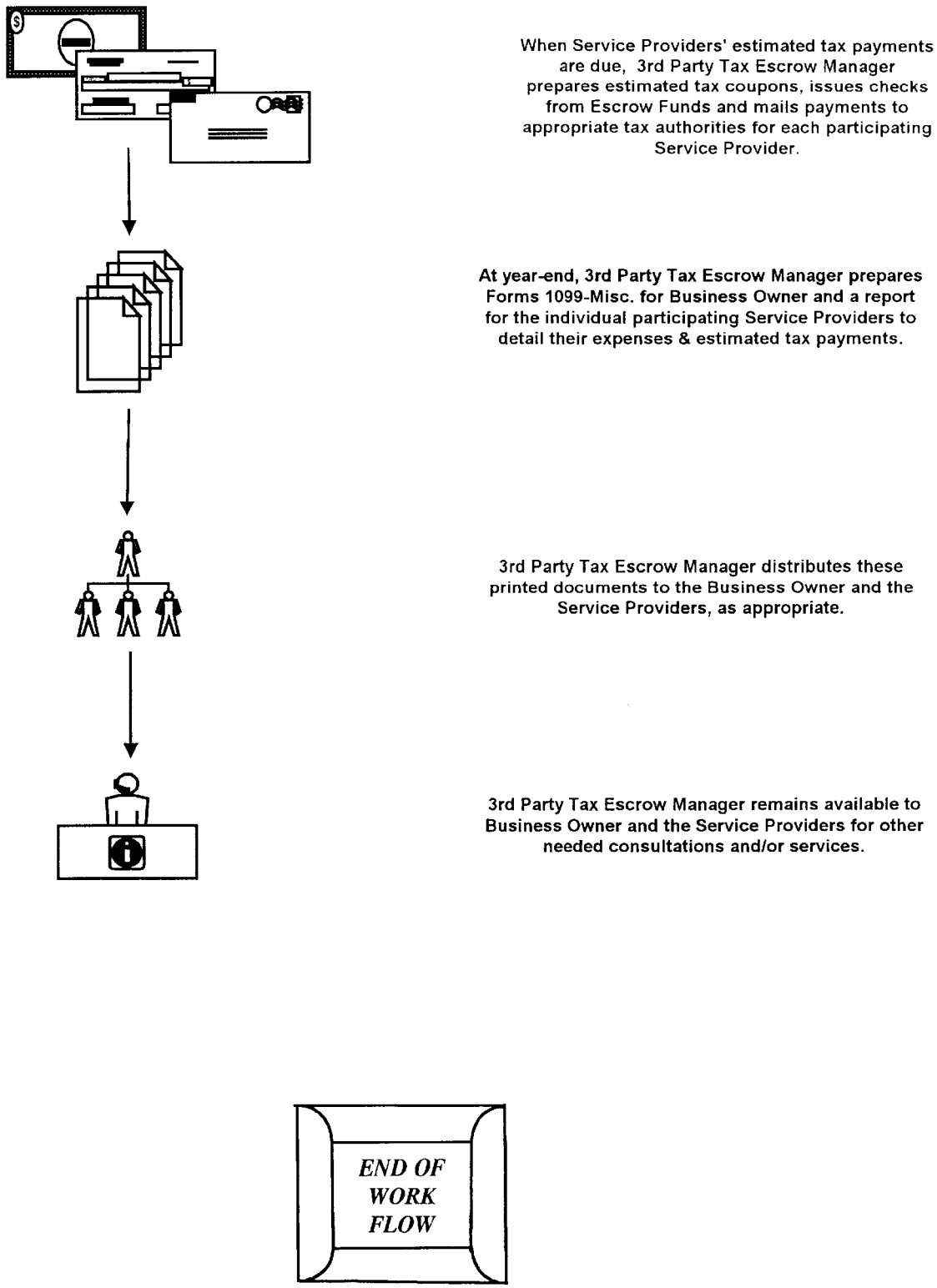

System Procedure Flow Chart

System Procedure Flow Chart

SUB A

Procedures for computing the Tax Escrow Deduction for a participating Service Provider (according to which of the two possible methods the Service Provider selects when he/she signs up for the program).

System Procedure Flow Chart

Quarterly Estimated Tax Payment Procedures
(Due Dates: April 15 y1, June 15 y1, September 15 y1, & January 15 y2).

System Procedure Flow Chart

Year-End reporting procedures.

System Procedure Flow Chart

FIGURE 3-5

Sample Service Provider Fee Payment Check.

---

Handy Man, Inc.  
Check No. 122648  
Check Date: 01/21/00

Service Provider Name: Jack Swan    SSN: 333-22-7227  
Service Provider No.    118  
Fee Period:    01/02/00 - 01/15/00

| Description | This Period | | Year-To-Date | |
|---|---:|---|---:|---|
| Service Provider Fee: | $ 2,383 | 00 | $ 2,383 | 00 |
| Escrow Deduction: | $ 834 | 00 | $ 834 | 00 |
| Escrow Maint. Fee: | $ 10 | 00 | $ 10 | 00 |
| Net Check: | $ 1,538 | 00 | $ 1,538 | 00 |

---

Handy Man, Inc.      Check No. 122648  
918 Gold Swan Ave.      01/21/00  
Swan Lake, Michigan 48722

Pay to    Jack Swan      $ 1,538.00

*One Thousand Five Hundred, Thirty- Eight and no/100 dollars*

Jack Swan  
722 Silver Swan Drive  
Swan Lake, Michigan 48722

VOID---NON-NEGOTIABLE

122648      888888      444444

System Procedure Flow Chart

FIGURE 3-6

Sample Check to 3rd Party Escrow Manager
for Service Providers' Tax Escrow

---

Handy Man, Inc.                                    Check No. 122667
                                                       Check Date: 01/21/00

Vendor Name: Heart & Swan Accounting
    Vendor No.   22
    Distribution: A/C# 205 A/P-Service Providers' Tax Escrow Memo: Service Providers' Tax Escrow Deductions
           Fee Period: 01/02/00 - 01/15/00            Check Amount: $7,222.00

---

Handy Man, Inc.                                        Check No. 122667
918 Gold Swan Ave                                      01/21/00
Swan Lake, Michigan 48722

Pay to Heart & Swan Accounting                     $ 7,222.00

Seven Thousand Two Hundred, Twenty-Two and no/100 dollars

Heart & Swan Accounting
1967 Heartfelt Lane
Swan Lake, Michigan 48722

VOID---NON-NEGOTIABLE

122667          888888          444444

---

| DATE: 01-21-00 | CURRENCY | COIN | List each check seperately | Handy Man, Inc. | # 122667 $7,222.00 | | | | | | | | | | TOTAL $7,222.00 |

Heart & Swan Accounting - Client Escrow
            222222     722722

System Procedure Flow Chart

FIGURE 3-7

Sample Check to 3rd Party Escrow Manager
for Service Providers' Escrow Maintenance Fees

---

Handy Man, Inc.  Check No. 122668
Check Date: 01/21/00

Vendor Name: Heart & Swan Accounting
Vendor No. 22
Distribution: A/C# 206 A/P-Service Providers' Escrow Maint. Fees Memo: Service Providers' Escrow Maintenance Fees
Fee Period: 01/02/00 - 01/15/00           Check Amount: $80.00

- - - - - - - - - - - - - - - - - - - - - - - - - - - - - -

Handy Man, Inc.                                Check No. 122668
~~918 Gold Swan Ave.~~                         01/21/00
Swan Lake, Michigan 48722

Pay to  Heart & Swan Accounting            $ 80.00

****Eighty and no/100 dollars****

Heart & Swan Accounting
1967 Heartfelt Lane
Swan Lake, Michigan 48722

VOID---NON-NEGOTIABLE

122668       888888       444444

System Procedure Flow Chart

FIGURE 3-8

Sample Check to 3rd Party Tax Escrow Manager for
Service Providers' Check Processing Fees.

---

Handy Man, Inc.  Check No. 122669
Check Date: 01/21/00

Vendor Name: Heart & Swan Accounting
Vendor No.   22
Distribution: A/C# 605  Accounting Fees Memo: Service Providers' Check Processing Services
Fee Period: 01/02/00 - 01/15/00           Check Amount: $45.00

- - - - - - - - - - - - - - - - - - - - - - - - - - - - -

Check No. 122669

Handy Man, Inc.
918 Gold Swan Ave.                   01/21/00
Swan Lake, Michigan 48722

Pay to   Heart & Swan Accounting          $ 45.00

****Forty-Five and no/100 dollars****

Heart & Swan Accounting
1967 Heartfelt Lane
Swan Lake, Michigan 48722

VOID---NON-NEGOTIABLE

122669         888888         444444

System Procedure Flow Chart

FIGURE 3-9

Sample Estimated Federal Tax Payment Coupon and Check
to Internal Revenue Service on behalf of Service Providers.

---

Heart & Swan Accounting  Check No. 7227
Check Date: 04/10/00

Vendor Name: United States Treasury
Vendor No.: IRS-JSWAN
Distribution: A/C# 222 Escrow - Jack Swan Memo: SSN: 333-22-7227 & 722-12-1948 (Swan, Jack & Jill)
2000 Form 1040-ES (1Q00)

Check Amount: $3352.00

- - - - - - - - - - - - - - - - - - - - - - - - - - - - - - -

Heart & Swan Accounting  Check No. 7227
1967 Heartfelt Lane
Swan Lake, Michigan 48722  04/10/00

Pay to  United States Treasury  $  3352.00

*Three Thousand, Three Hundred, Fifty-Two and no/100 dollars*

Internal Revenue Service
P. O. Box 7422
Chicago, IL 60680-7422

Memo: SSN: 333-22-7227 & 722-12-1948 (Swan, Jack & Jill)  VOID---NON-NEGOTIABLE
2000 Form 1040-ES (1Q00)
7227        222222        722722

---

| Form 1040-ES | | Payment | | |
|---|---|---|---|---|
| Department of the Treasury Internal Revenue Service | 2000 | Voucher  1 | | OMB No. 1545-0087 |

File only if you are making a payment of estimated tax. Return this voucher with check or money order payable to the "United States Treasury." Please write your social security number and "2000 Form 1040-ES" on your check or money order. Do not send cash. Enclose, but do not staple or attach, your payment with this voucher.

Calendar year-Due April 15, 2000

| | | Your First name and initial | Your last name | Your social security number |
|---|---|---|---|---|
| Amount of payment | Please type or print | Jack | Swan | 333-22-7227 |
| | | If joint payment, complete for spouse | | |
| | | Spouse's first name and initial | Spouse's last name | Spouse's social security number |
| $ 3352.00 | | Jill | Swan | 722-12-1948 |
| | | Address (number, street, and apt. no.) | | |
| | | 722 Silver Swan Drive | | |
| | | City, state, and ZIP code (If a foreign address, enter city, province or state, postal code, and country.) | | |
| | | Swan Lake, | MI 48722 | |

For Privacy Act and Paperwork Reduction Act Notice, see instructions on page 5.

TAX ESCROW SYSTEM FOR INDEPENDENT CONTRACTORS

FIELD OF USE

The invention relates generally to systems used to ensure the viability of independent contractors from taxing authorities, and more particularly, a tax escrow system that enables funds due an independent contractor for services provided to be placed in an escrow for payment to any taxing authority.

BACKGROUND OF THE INVENTION

Among small business owners, there is one distinctive large category that needs specialized guidance and assistance. This group is commonly referred to as independent contractors or subcontractors and include anesthesiologists, cable TV line installers, construction workers, court reporters, delivery route workers, drywall finishers, electricians, exterminators, hair dressers, home health care providers, house painters, insurance agents, lawn care workers, marketing representatives, medical transcriptionists, nail technicians, outside sales persons, plumbers, real estate agents, stenographers, telemarketers, truck drivers, window washers, and numerous others.

Many subcontractors do not possess the training or discipline to budget their income or allocate funds for taxes. The subcontractors' intention to pay the taxes in a timely manner fail when the funds are not available. The taxes are left unpaid because unexpected expenditures arise.

Also, many subcontractors do not actively decide to start a business but rather do so while job searching and performing smaller tasks. Many do not realize they are self-employed and responsible for both halves of their social security taxes, and therefore, how large their tax liability is until it is too late. Several of these jobs do not require special skills or education, so there aren't any training programs in our education system that would include explaining the tax ramifications to potential subcontractors.

Hence, the need for the system of the present invention has evolved. These subcontractors need help to allocate their taxes as they earn their income, and they must be taught the ramifications of the tax laws which affect them, what deductions are allowable, and how to keep appropriate records.

SUMMARY OF THE INVENTION

Many labor-intensive small businesses classify their workers as subcontractors. Subcontractors (hereafter referred to as service providers) are responsible for paying their own self-employment (social security) and income taxes, whereas employees' taxes are withheld and paid to the government by the employer. Often the service provider fails to allocate a portion of their check for taxes. Consequently, substantial penalties and interest are assessed and the service providers find themselves in a vicious circle because they also owe taxes on their current earnings. These unpaid tax liabilities quickly become unmanageableifor many service providers, which can result in the loss of everything they worked for and acquired over the years. Our Self-Employed e-Tax Escrow System (hereafter referred to as the system of the present invention) was created to resolve this dilemma. Our firm will prepare the business owners' checks for their service providers, deducting a tax escrow. When taxes are due, these funds will be appropriately disbursed, and the service providers will not have to be concerned about penalties, interest, or government notifications.

The system of the present invention will also benefit the small business owners. The IRS has increased their efforts in examining whether reported subcontractors are actually employees. In the event of an adverse determination, the IRS may require the business owner to pay both portions of taxes in addition to substantial penalties and retroactive interest if these taxes have not been paid by the service providers.

Often these adverse determinations include at least two or three years. These assessments would be devastating to most labor-intensive small business owners and may cause annihilation.

Because they are not aware of our solution to their problem, business owners are trying to protect themselves. A trend is developing in the delivery service industry (and others as well) to force the drivers (service providers) to become incorporated in order to protect the business owners (contractors) from an adverse determination by the IRS. Business owners are required to report the fees paid to an individual subcontractor on a Form 1099, but not fees paid to a corporation. Also, employees must be individuals, not corporations. Even large corporations hike Ford Motor Company with retired employees such as engineers who want to work part-time as consultants are forced to start corporations (at the workers' expense) before Ford will allow them to work again.

This trend is causing numerous corporations to be created for purposes inconsistent with the intended purposes of these entities. Thus, it is causing a substantial workload increase on the state agencies which are responsible for authorizing, maintaining records on, and regulating corporations.

The workload for the IRS is also substantially increased because these corporations are required to obtain separate taxpayer identification numbers and file a multitude of tax and information returns.

Business owners are protected from a possible determination by the IRS that their workers are employees, as well as the expenses for record-keeping time and preparation of informations returns (1099's) by forcing their workers to incorporate. But, service providers are incurring additional burdens since they are forced to pay extra professional fees and taxes for the corporation they created in order to keep their position ("job"). We know one service provider who was given a form to sign by his contractor, told to mail it in with a $60.00 check, and was unaware he was creating a corporation.

Corporate returns are more difficult and their related penalties are more severe than for individual returns. The filing deadline is a month earlier and is very often overlooked by taxpayers. When filing deadlines are missed, there is an automatic $500.00 "Failure to File Penalty", even if there is no tax due.

Business owners are creating a mass accumulation of paperwork for service providers and our government. The system of the present invention is a more practical method of simultaneously reducing noncompliance and nonpayment of taxes by service providers, protecting business owners' status as contractors, and reducing paperwork for service providers and government agencies.

When entrepreneurs participate in the system of the present invention, one of the initial procedures will be to review with them the reporting requirements and guidelines the IRS uses to determine if workers are subcontractors or employees. They will be advised on what steps should be taken to avoid an: adverse determination. Participation in the system of the present invention could be a factor utilized to help prevent an; adverse determination.

In addition to the benefits which participating service providers and business owners will receive from the system of the present invention, the federal, state, and city (when applicable) governments will receive the greatest benefits from our system. The taxes owed by the participating service providers will be paid timely, which will substantially reduce costly collection efforts and substantially increase quarterly cash flow.

The massive bottleneck of government paperwork, which is being created because business owners are trying to protect their contractor status by forcing service providers to create corporations, can also be halted before it becomes unmanageable.

The taxpayers who are bearing the cost of running our country will be helped by the system of the present invention. As tax payments become timely, government cash flows increase, and the cost of governmental workloads are reduced, and all taxpayers will have a lighter tax burden.

For a more complete understanding of the tax escrow system of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIGS. 2-1 through 2-5 disclose a simplified logic diagram for purposes of illustration of a work flow diagram for the tax escrow system of the present invention:

FIGS. 3-1 through 3-9 disclose a simplified logic diagram for purposes of illustration of a system procedure flow chart for the tax escrow system of the present invention:

DETAILED DESCRIPTION OF THE PRESENT INVENTION

Figures 1, 2:
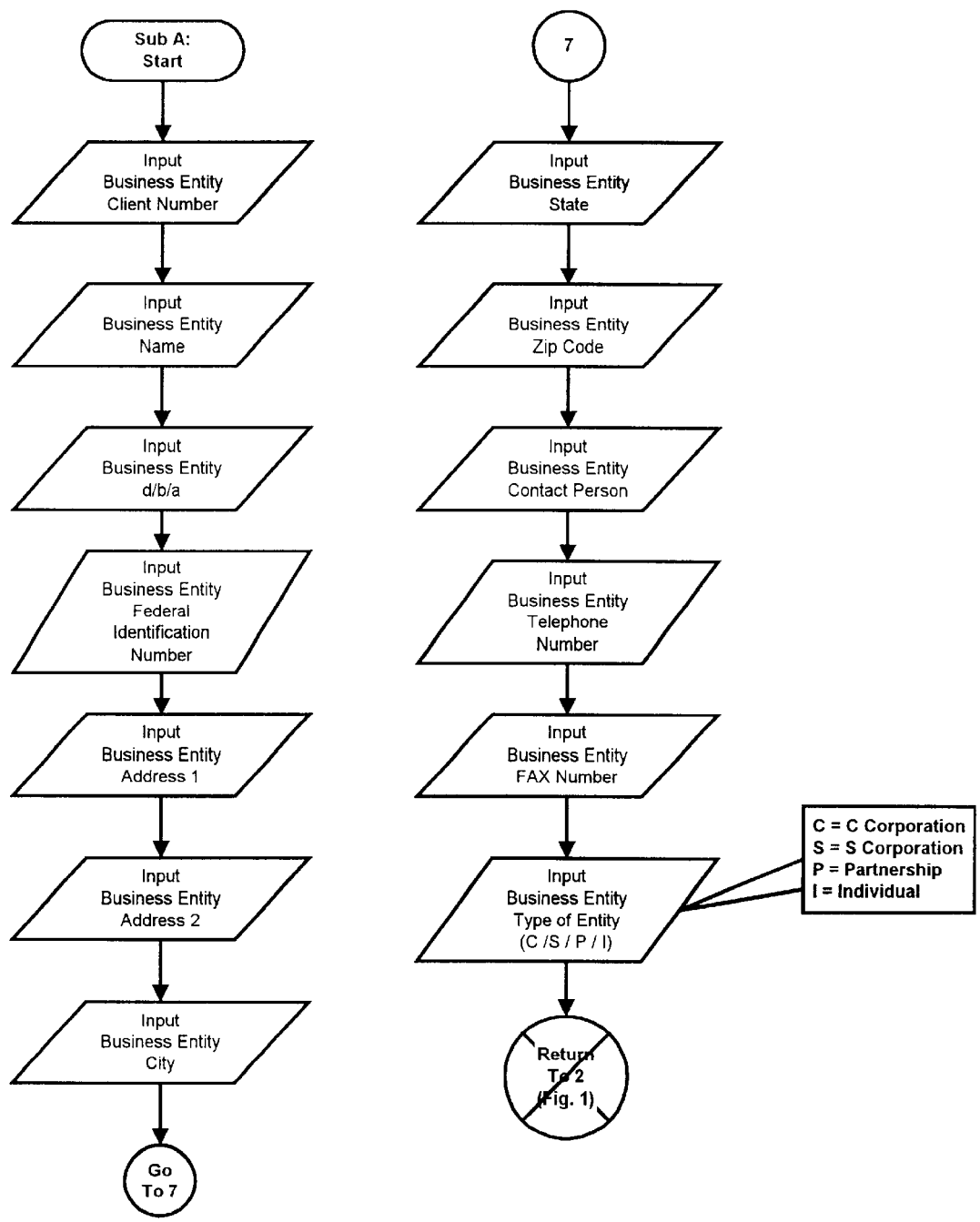
FIGS. 1-1 through 1-11 disclose a simplified logic diagram for purposes of illustration of a software program flowchart for the tax escrow system of the present invention.
Figures 1, 2, 3:
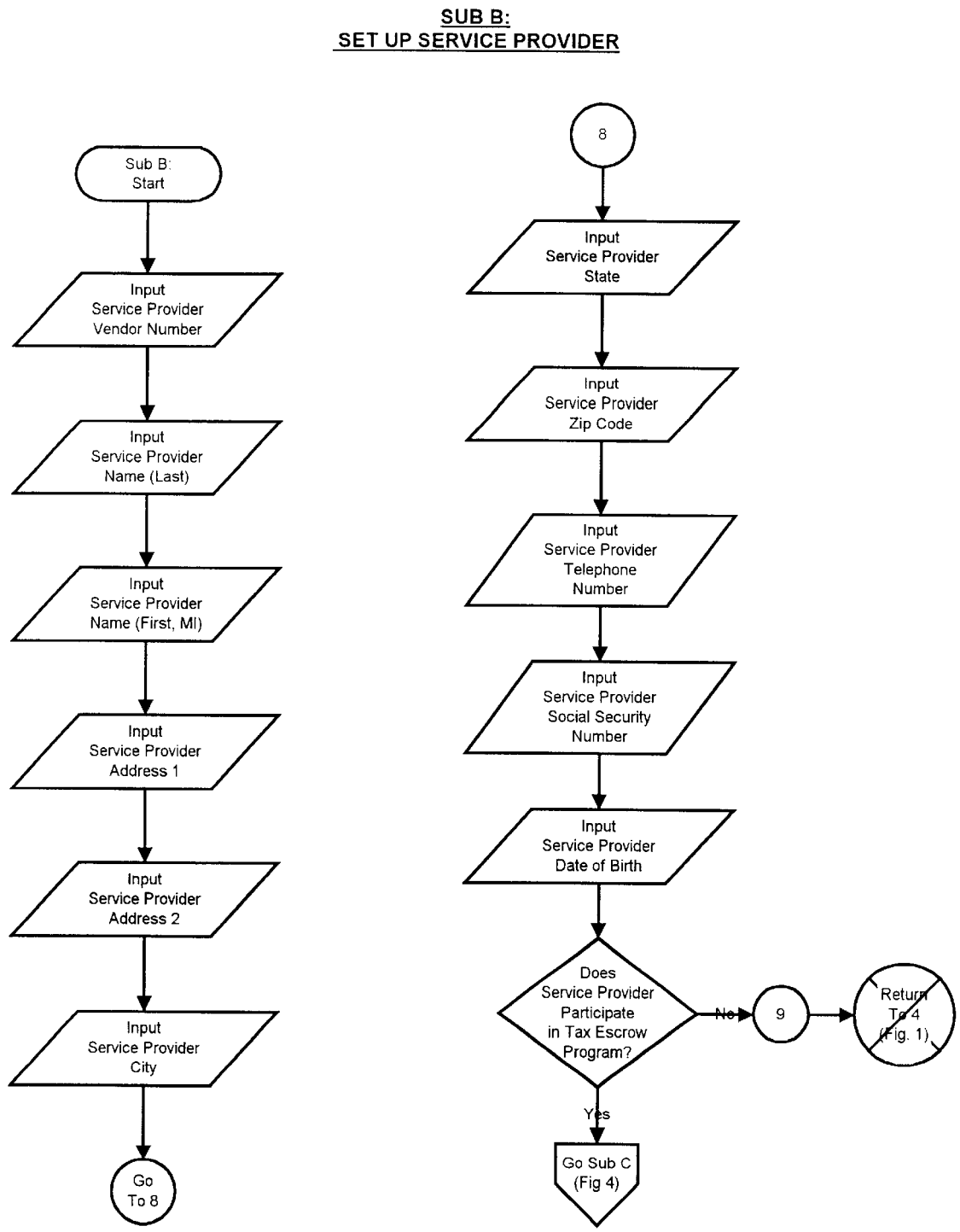
Figures 1, 2, 3, 4:
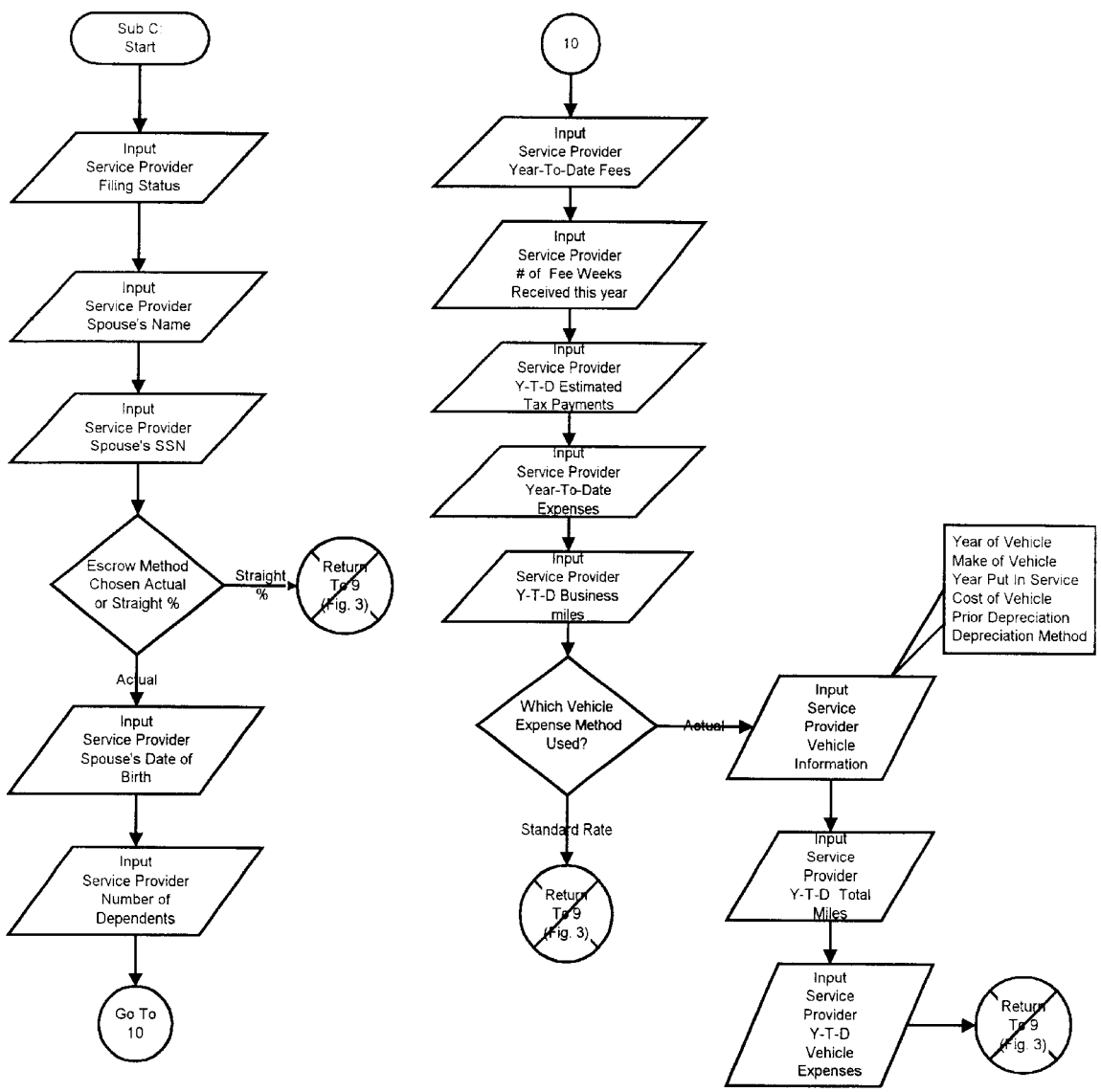
Figures 1, 2, 3, 4, 5:
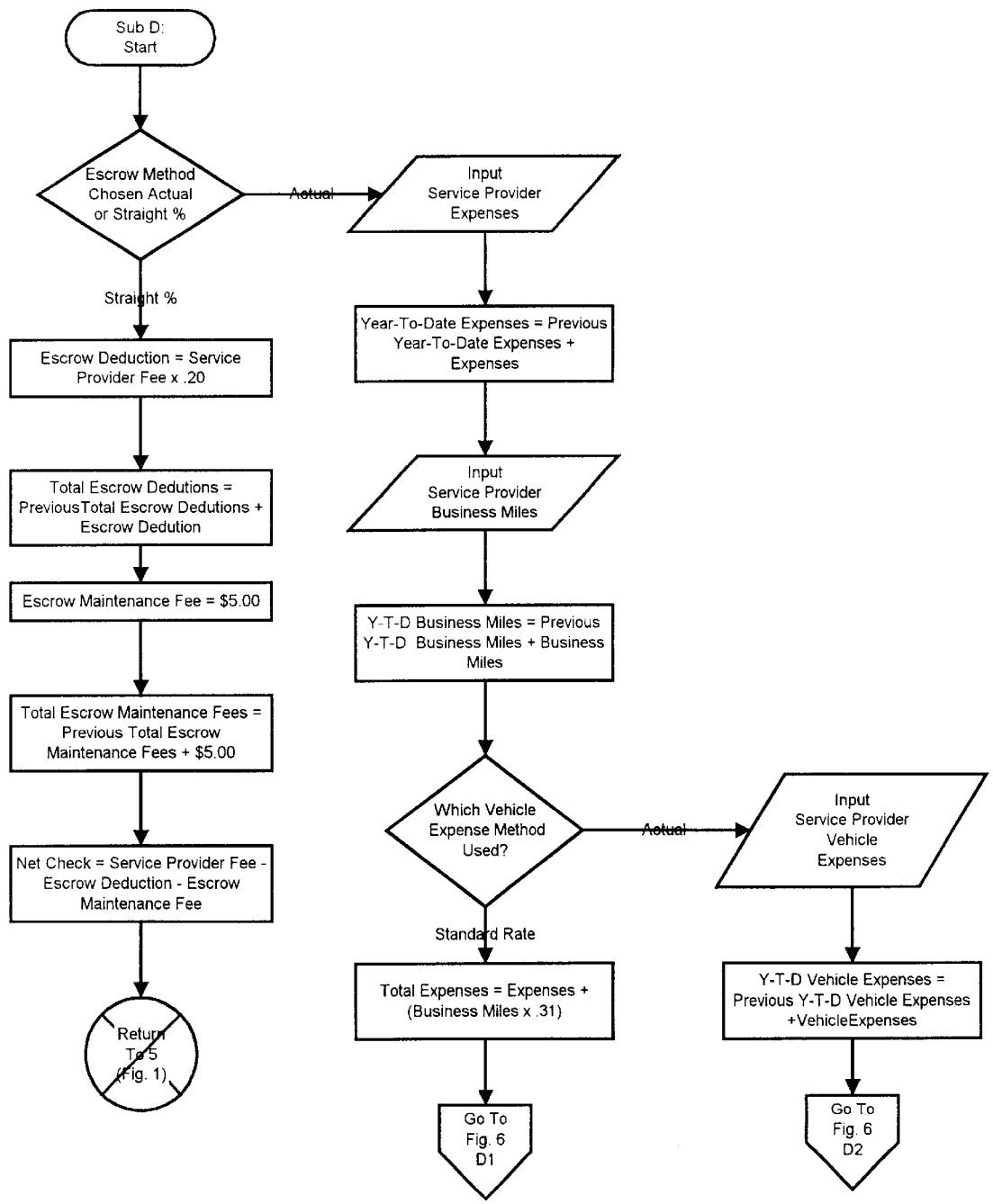
Figures 1, 2, 3, 4, 5, 6:
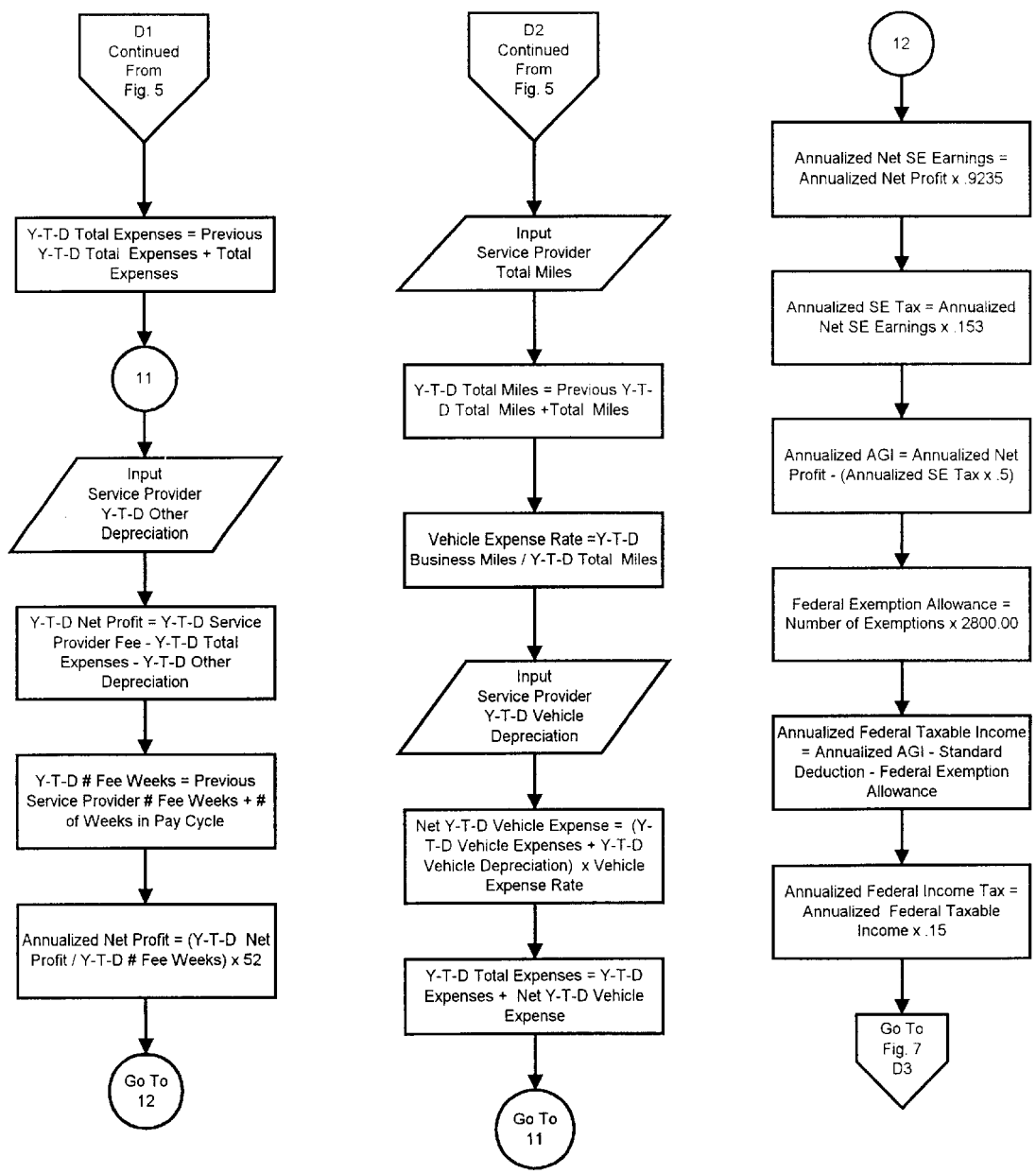
Figures 1, 2, 3, 4, 5, 6, 7:
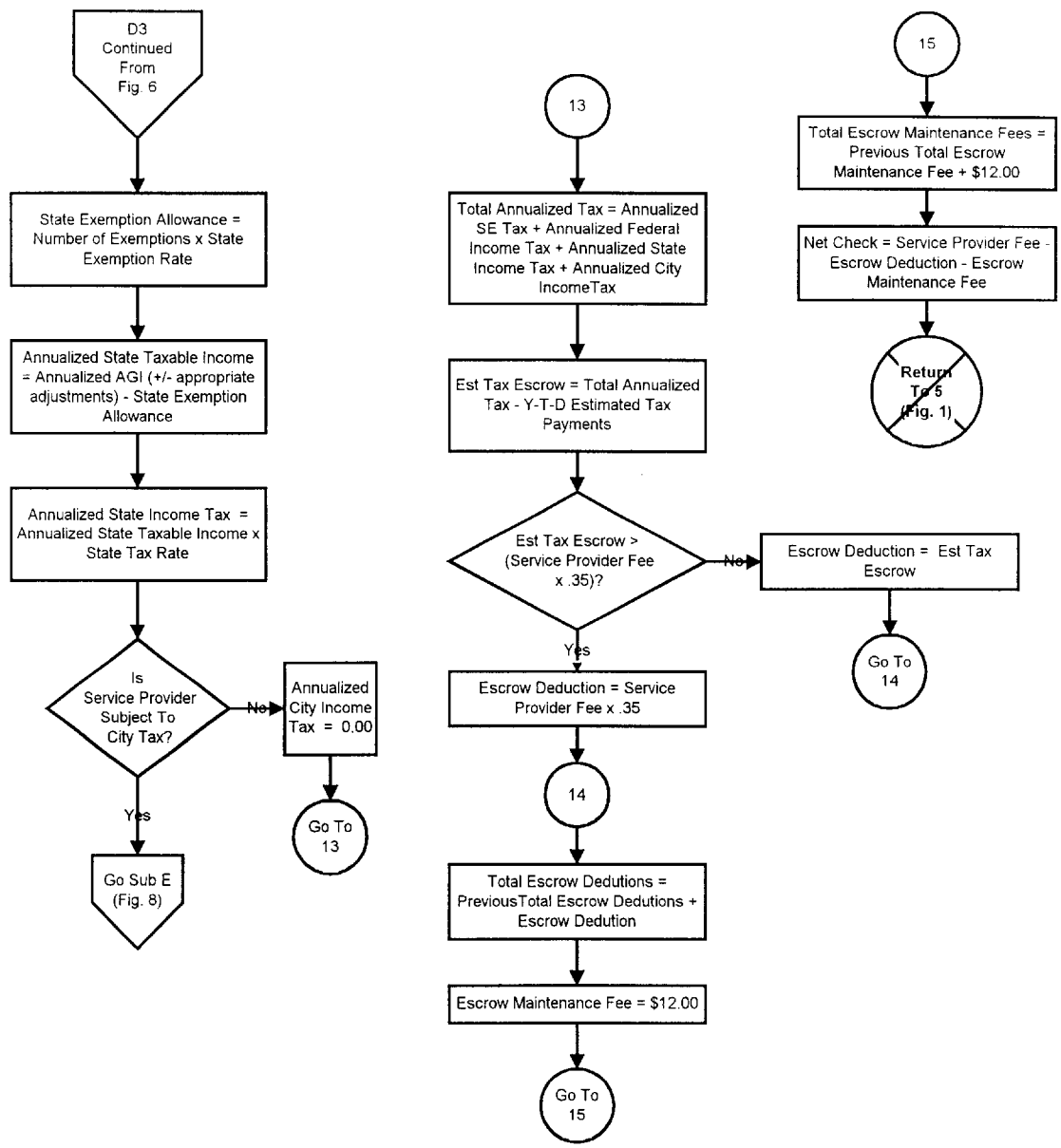
Figures 1, 2, 3, 4, 5, 6, 7, 8:
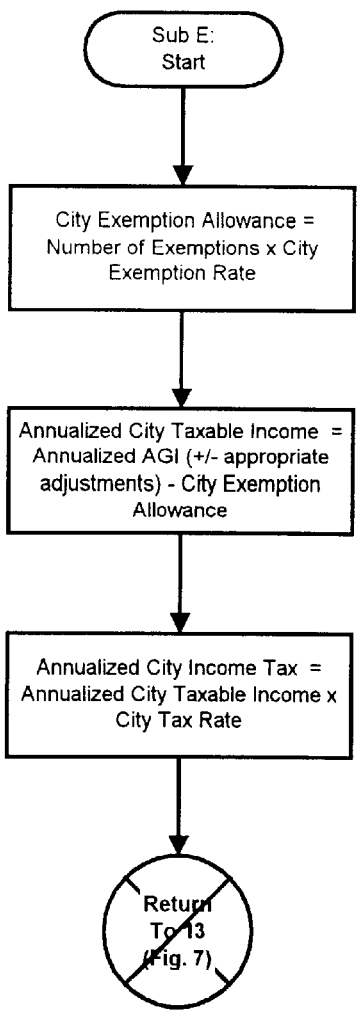
Figures 1, 2, 3, 4, 5, 6, 7, 8, 9:
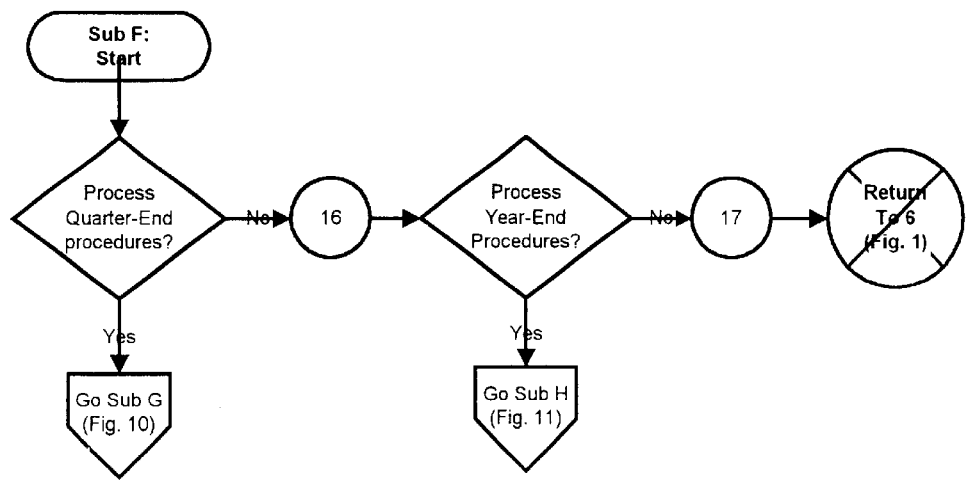
Figures 1, 2, 3, 4, 5, 6, 7, 8, 9, 10:
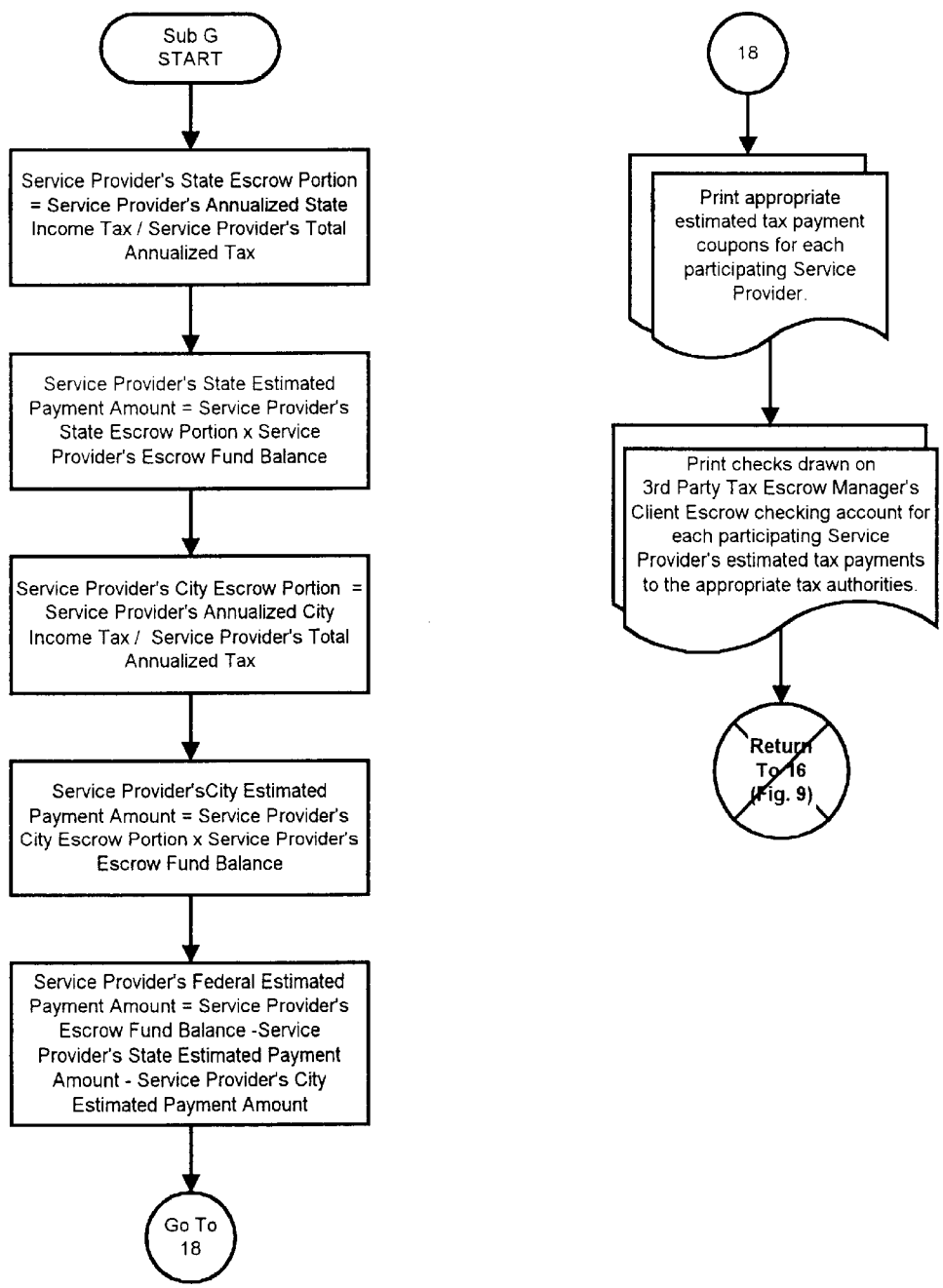
Figures 1, 2, 3, 4, 5, 6, 7, 8, 9, 10, 11:
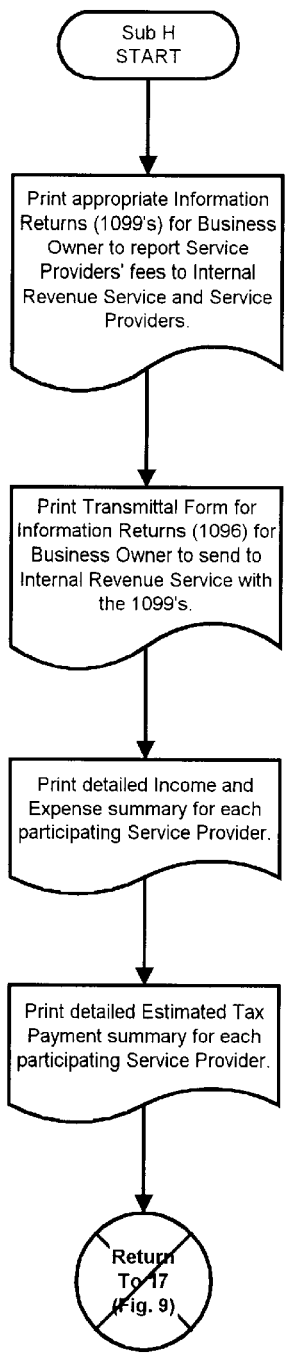
Figures 1, 2:
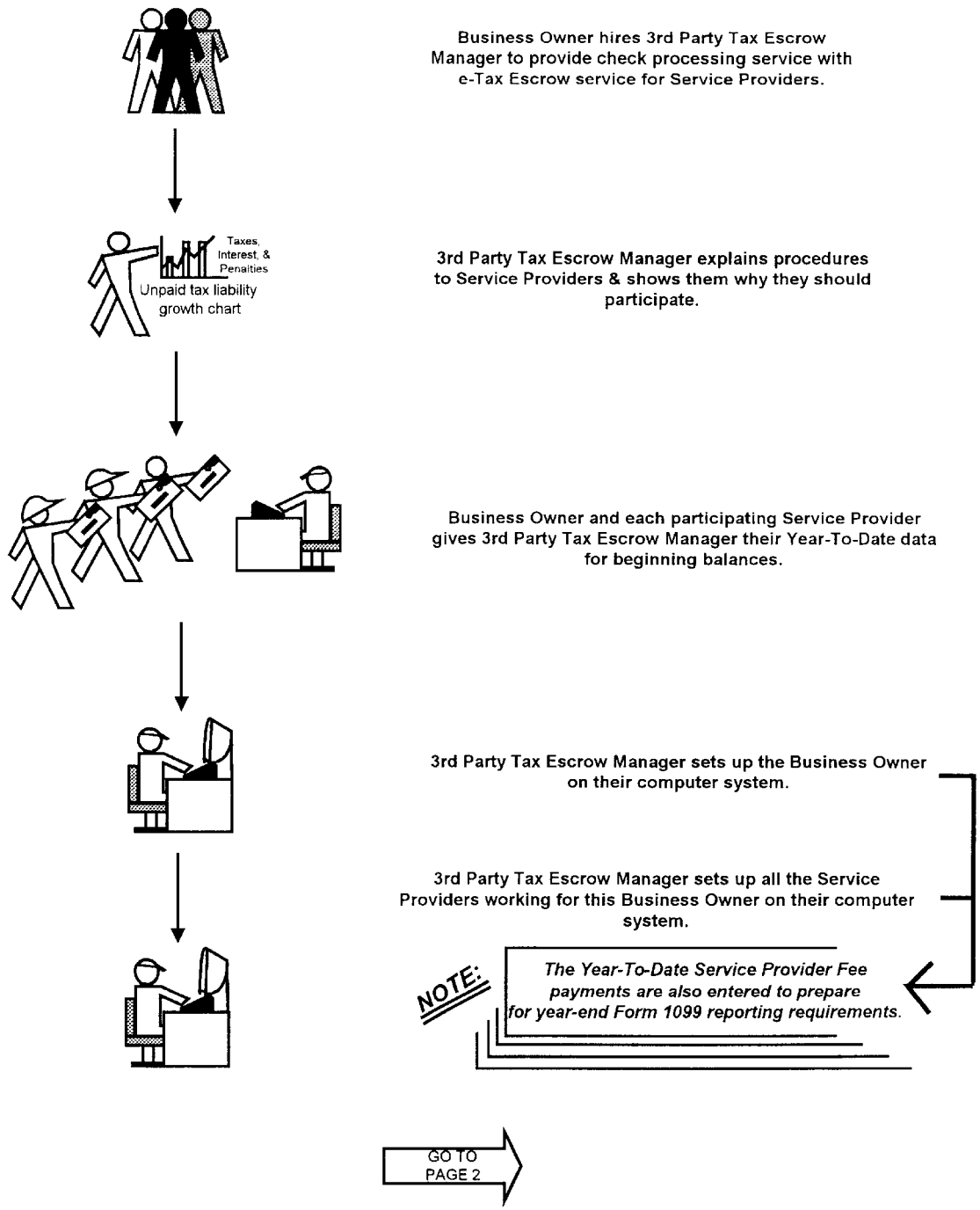
Figure 2:
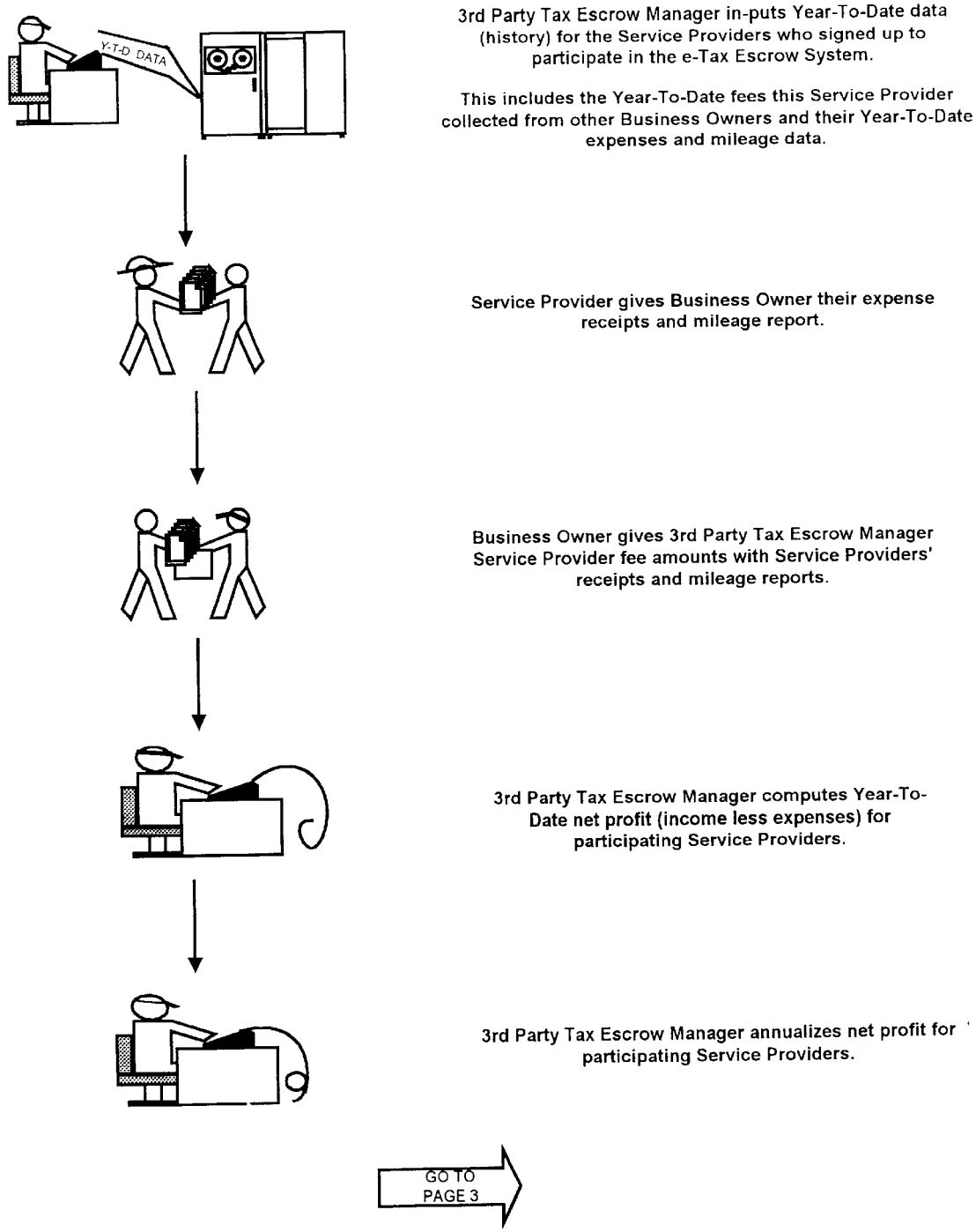
Figures 2, 3:
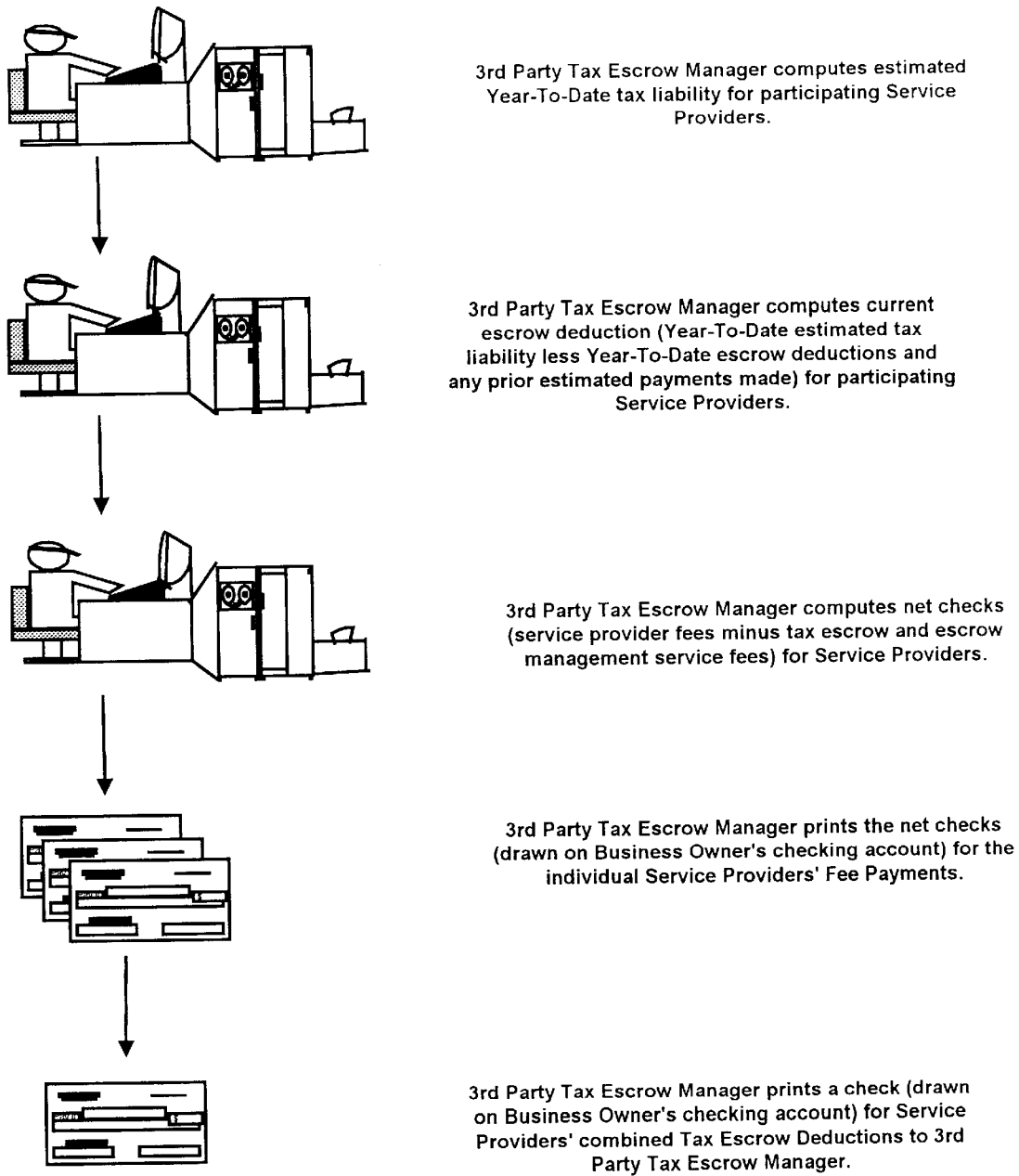
Figures 2, 3, 4:
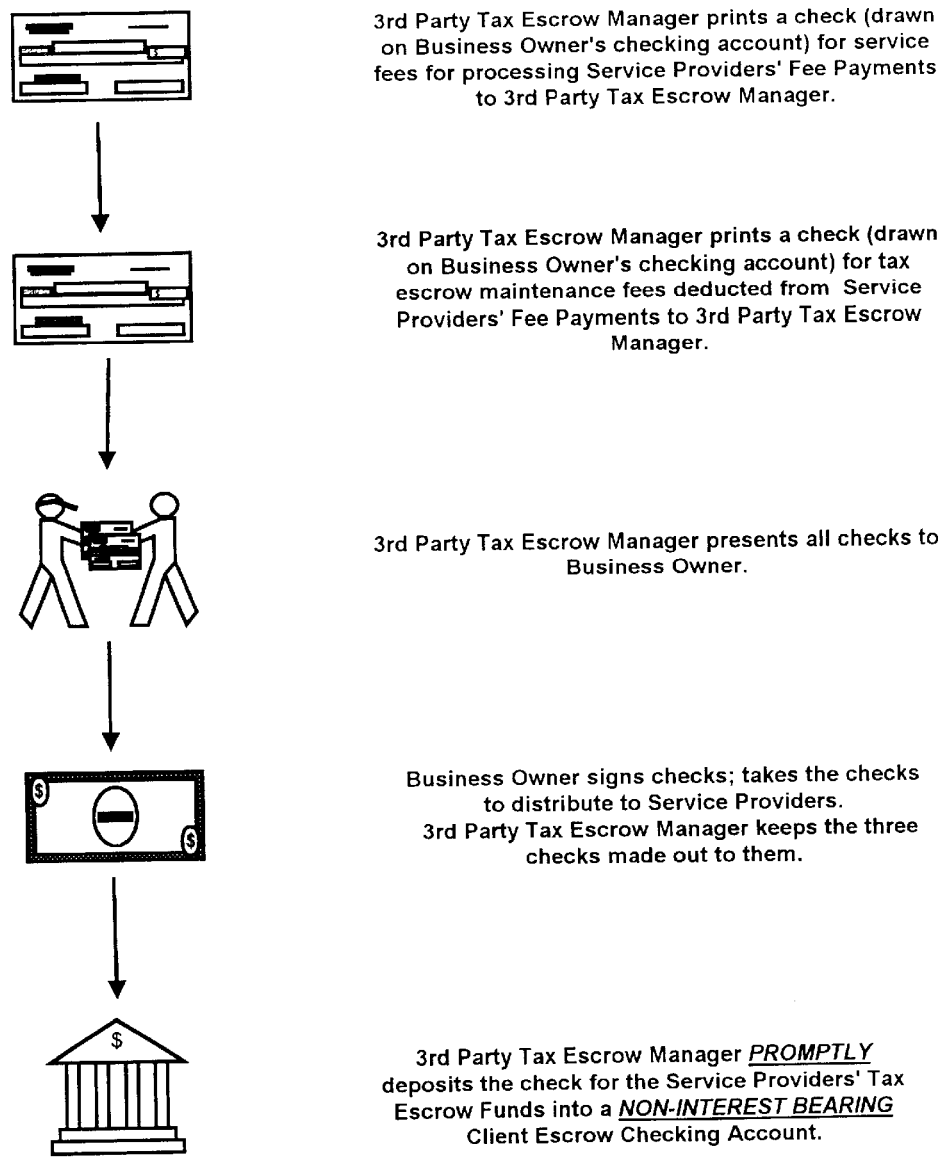
Figures 1, 3:
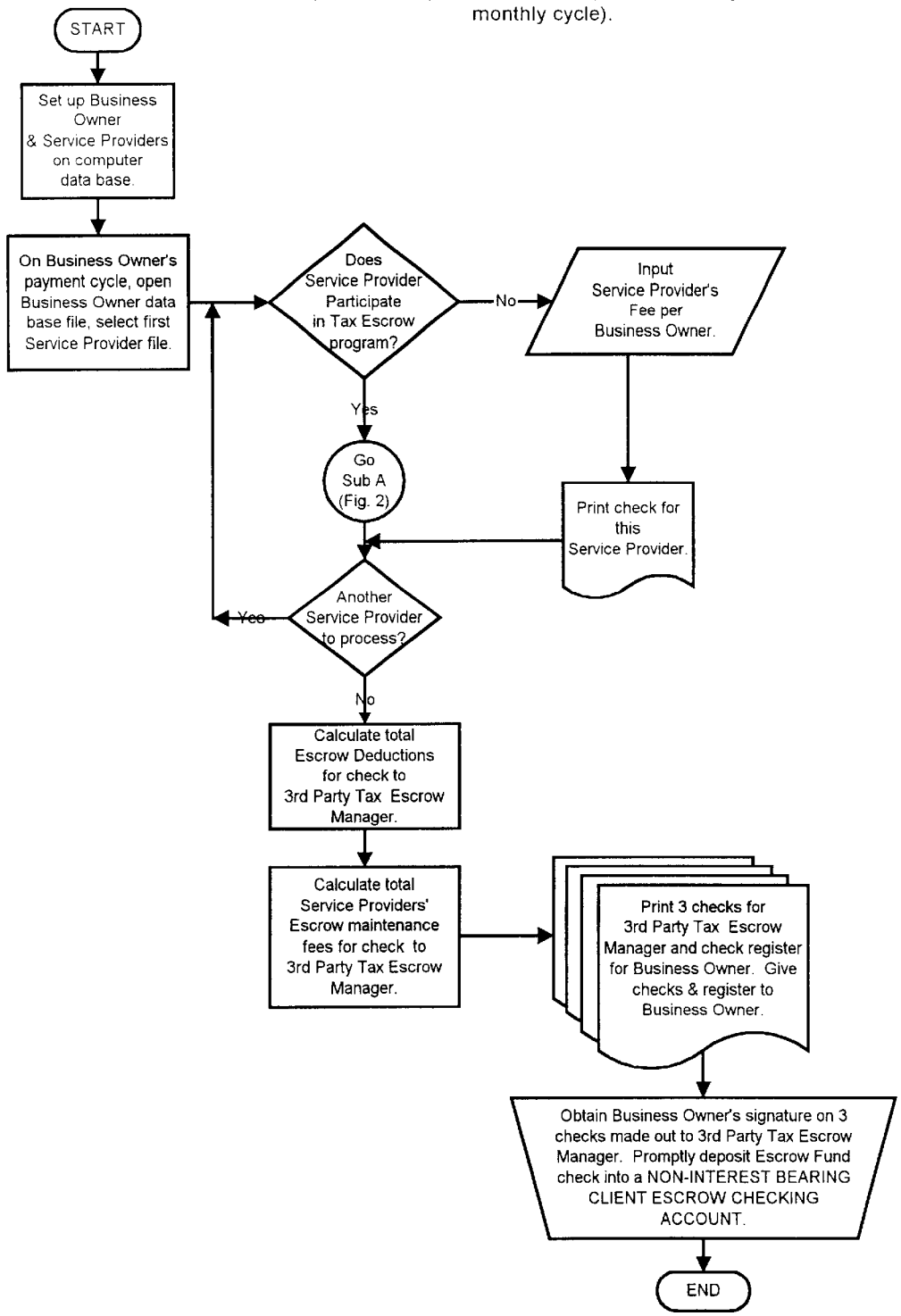
Figures 2, 3:
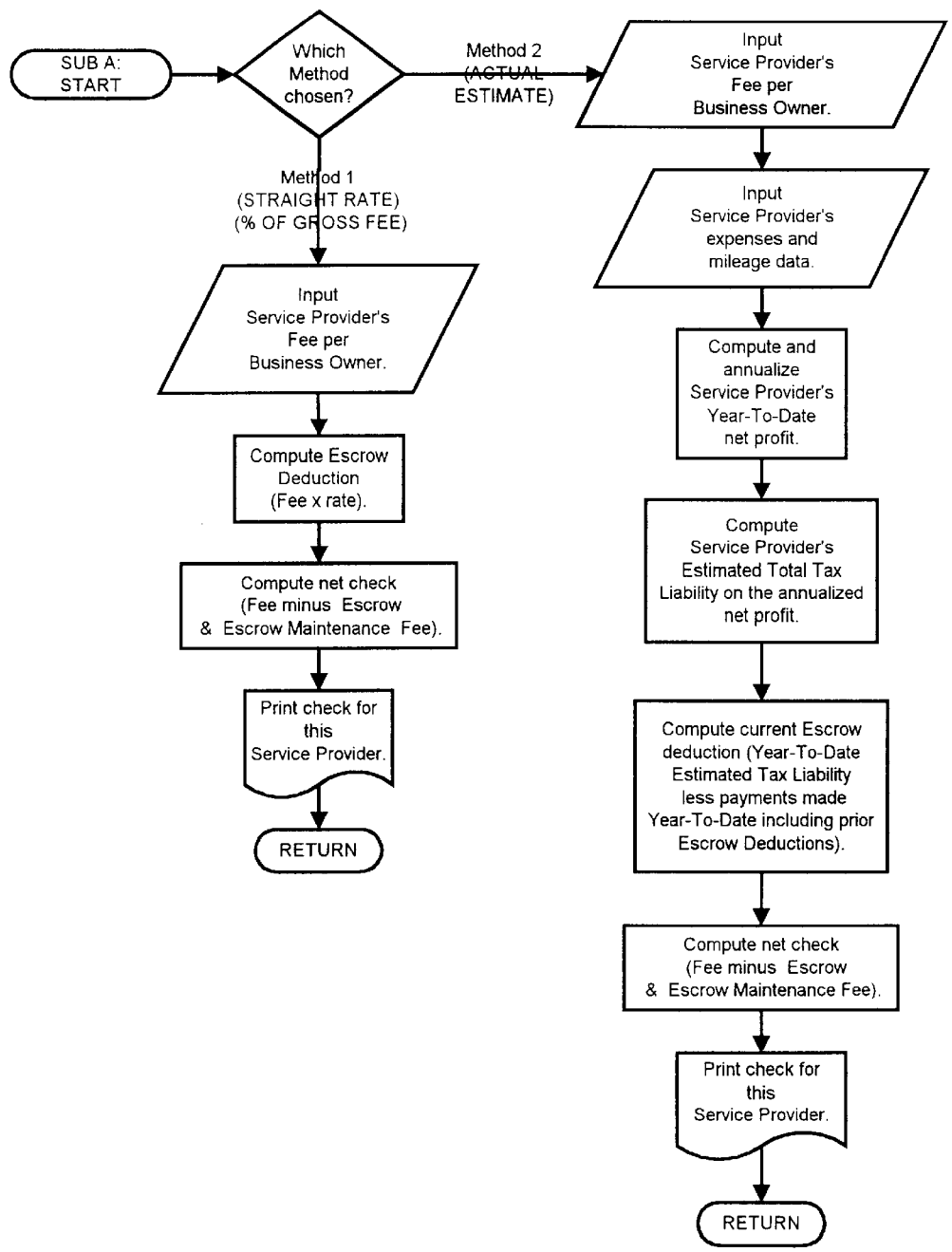
Figure 3:
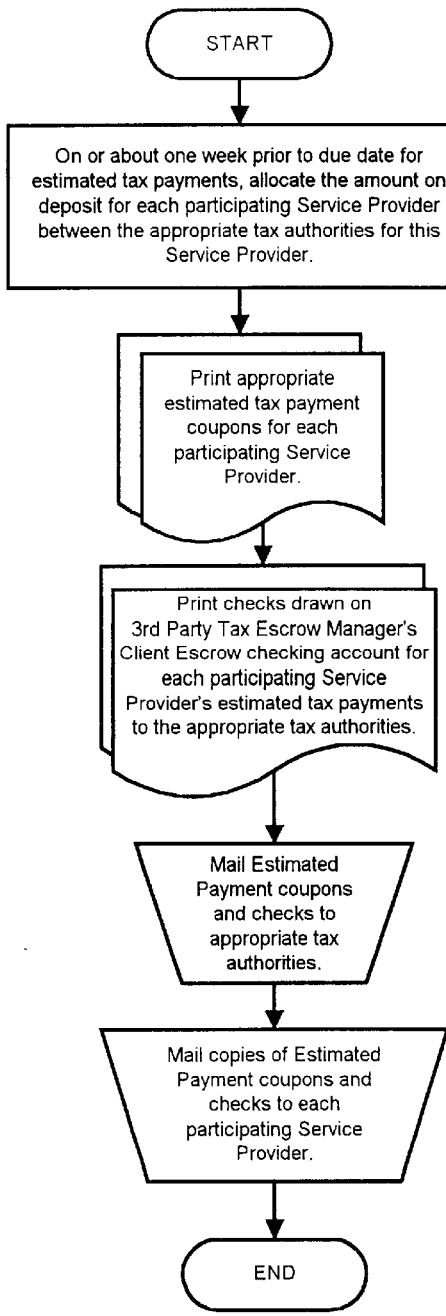
Figures 3, 4:
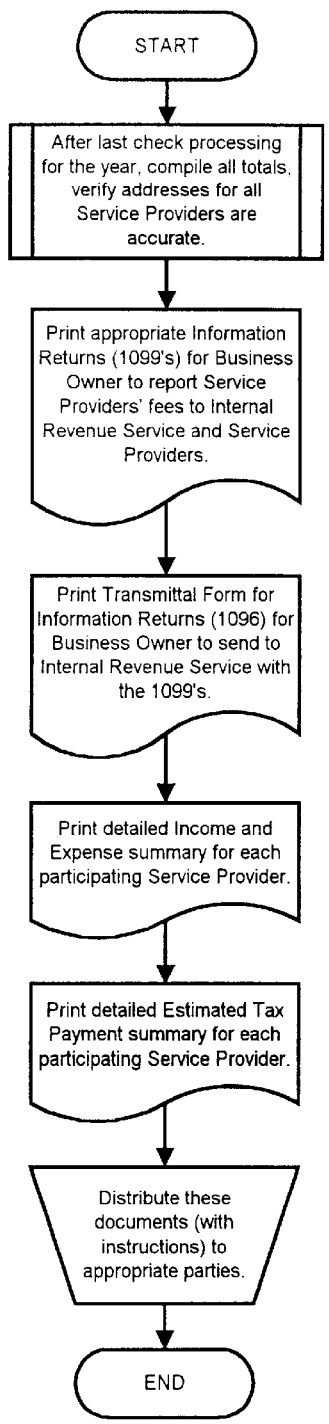

For the business owners, our firm will prepare the checks for their service providers' fees. Those service providers who participate in the system of the present invention will have a tax escrow (individually determined) deducted from their checks. When a service provider signs up for the system of the present invention, he will be asked to provide us with his filing status, the number of dependants he has, his year-to-date gross income, business expenses, business miles driven, and estimated taxes paid. The service provider will be provided with a form to update this information weekly.

We will calculate self-employment tax liability on his annualized profit and then appropriate federal, state, and local income tax liabilities according to his allowable personal exemptions for himself and his dependants. The tax escrow deduction will be a consolidation of these liabilities, prior estimated payments, and allowable credits.

A check will be issued from the business owner to our firm each week for the total escrow deductions, which will be promptly deposited into a non-interest bearing escrow checking account, and precise accounting records will be maintained by our firm. When tax payments are due, the appropriate coupons will be prepared and checks will be issued to the tax authorities.

If a participating service provider has prior tax liabilities, the appropriate amount to meet agreed upon payments will also be deducted and sent to the government as scheduled. If an agreement has not yet been reached with the government, and the service provider desires our firm to do so, we will correspond or meet with the taxing authorities to negotiate and implement a payment agreement for a reasonable fee. At year-end, the business owners will be issued the required Federal Forms 1099 (Statement of Miscellaneous Income) and 1096 (Annual Summary and Transmittal of U.S. Information Returns) for their service providers and the government; the participating service providers will be issued an income, expense, mileage, and a tax payment summary.

During the initial operation of the program, the service providers tax escrow will be manually computed because there is no known software program available to handle these calculations. In addition to providing this service to business owners and service providers, our goal is to have a software program developed to make the tax estimates, check processing, and the report generation as efficient as possible.

The software will include the ability to process optional electronic fund payments (direct deposit) from the business owners' checking accounts to the service providers+ checking accounts. For processing efficiency, the IRS is encouraging taxpayers to file more and more tax returns electronically. We will obtain IRS specifications so the software will electronically file the quarterly estimated tax payment forms (Form 1040ES) for the service providers and the year-end information returns (Forms 1099 & 1096) for the business owners.

An extra value to the service providers and business owners is that the electronic filing system has a built in acknowledgement of receiving the return, which will safeguard against Failure To File and Late Filing penalty assessments. Also, we will utilize the IRS's Electronic Federal Tax Payment System (EFTPS), which is currently in use for large employers to pay their payroll taxes. Since this EFTPS is only in use for employers at this time, we will work with the IRS to make the transition for also accepting our utilization of this system to make both government and our processing of the tax escrow payments as efficient as possible.

The tax escrow system of the present invention is applicable to the services provided by accountants, bookkeepers, and payroll check processing service bureaus to expand the scope of this service nationwide. To maintain the integrity of the program, prospective third party escrow managers will either have to be Certified Public Accountants or they will have to be bonded and they will be required to maintain appropriate liability insurance. They will also have to qualify for the IRS's electronic tax return filing system.

With these goals in mind, the preliminary flowchart for the software has been developed and is included later in this document. Also, several engagement agreements and procedural control documents have been designed for this service.

Even though we realize the strong need for this program, we anticipate that the business owners and service providers will view this program as a service which will benefit the government more than it will benefit them. Accordingly, we do not expect rapid acceptance and immediate willingness to participate. We envision that the government should consider encouraging the business owners and service providers to participate by implementing a small tax credit on taxes paid through the the system of the present invention to both business owners and service providers who do participate in this program. Like prior amnesty programs, a tax credit may reduce some liabilities, but in the long run, the timely payments, more even cash flow, and reduction in work load will more than make up for any credits given.

The tax escrow system of the present invention provides multiple benefits.

Benefits for the IRS
1) receive increased quarterly cash flow from timely estimated payments from our tax escrow fund.
2) reduce lost revenues due to non-payments and write-offs of uncollectable taxes.
3) reduce costs of finding the subcontractors and collecting the taxes from them.
4) reduce paperwork (correspondence and postage) requesting returns and payments and investigating noncompliance.
5) decrease staff expenditures as work load for correspondence and tracking noncompliant taxpayers is eliminated.
6) decrease the need to process garnishments and levies.

Taxpayer Benefits
1) reduced expenses for irs operations.
2) more even cash flows to the irs may help reduce taxes needed in future.
3) subcontractors now pay their fair share of taxes to run the country, which will eliminate extra tax burden on those who do pay.
4) assurance that social security system will be strengthened because social security taxes will be paid timely.

Advantages for Participating Business Owners
1) protect their contractor status.
2) reduce record-keeping time.
3) reduce large year-end fees to compile data for preparation of 1099's.
4) assist service providers avoid penalty and interest assessments.
5) reduce time to prepare documentation so that workers compensation insurance audits and tax audits conclude easier.

Advantages for Participating Service Providers
1) have the funds available for timely tax payments.
2) eliminate penalty and interest assessments.
3) eliminate aggrivating irs correspondence.
4) have year-end total of mileage reported for their tax preparer.
5) have year-end record of tools & other expenses eliminating many hours of going through receipts.
6) eliminate missed deductions because of lost receipts.
7) reduce year-end fees by tax preparer to compile mileage and deduction data.
8) share in the benefits of all other taxpayers that tax rates may be reduced and assurance that our social security system will be strengthened and everyone's tax burden will be lowered.

The penalties and interest on each unique situation were calculated as per the procedures and rates which the IRS publish in their instructions for the particular types of taxes and penalties addressed. There are conditions for waiving some penalties, which would change the outcome of the computations. The calculation detail is too massive to include with the examples; however, it is available for review, upon request.

The following are examples of some tax problems which can be avoided by using the system of the present invention. The examples in this section will be the primary focus of the consulting presentations for business owners and service providers.

EXAMPLE A

Handy Man, Inc. is a local business, which has been operating for about fifteen years, and has a modest profit for the year ended Dec. 31, 1996 of $37,686.88. The total Subcontract labor for 1996 was $128,219.78. The corporation has no employees, only subcontractors. The company is a small family-owned corporation. Randy Handy operates the business. He does not draw a paycheck from the business until the end of the year, and then he takes a draw against the profit for the year.

Near the end of 1996, Randy had to fire one of his subcontractors, Bob Wine, for drinking on the job and for doing shoddy work. Bob decided to get back at Randy by filing an SS-8 Form with the IRS, stating that Randy should have been deducting taxes from his check, and that Randy should have paid part of his Social Security taxes.

Randy did not take time to follow his accountant's advise and make sure all the paperwork was in order to protect his contractor status. Randy had not obtained W-9 Forms (Request for Taxpayer Identification Number and Certification) nor Subcontract Agreements from all of his subcontractors. Handy Man, Inc. performed multiple small contracting jobs. All of the subcontractors had been working steady at Handy Man, Inc. for several years, were not incorporated, did not advertise as a business, and did not work on other jobs or for other business owners.

If the IRS determined that Bob Wine and all the other subcontractors were employees, they could assess the following taxes, penalties, and interest on Handy Man, Inc.:

| | |
|---|---|
| Employee's FICA not withheld | $9,908.81 |
| Employee's Federal Income Tax ($128,220 × 10%) | 12,821.97 |
| Matching FICA Tax: ($128,220 × 7.65%) | 9,908.81 |
| FUTA Tax: (77,000 × 6.2%) | 4,774.00 |
| Penalty - Failure to Withhold | 2,043.00 |
| Penalty - Failure to Pay FICA & FIT | 6,147.92 |
| Penalty - Failure to File Form 941's | 7,300.00 |
| Penalty - Failure to Pay FUTA | 275.00 |
| Penalty - Failure to File Form 940 | 1,074.00 |
| Penalty - Trust Fund Recovery | 22,730.38 |
| Interest on FICA & FIT through Jul. 1, 1997 | 3,710.00 |
| Interest on FUTA through Jul. 1, 1997 | 495.00 |
| TOTAL ASSESSMENT | $81,188.89 |

Often this assessment will also be applied to the two prior years, in addition to the current year. Since SUTA was not paid timely, FUTA rate is 6.2% rather than 0.8%. Handy Man, Inc. was able to survive this tragedy, but could your business survive an assessment like this.

In addition to the Federal assessment in example 1, part A, the IRS also shares audit and tax information with the state tax departments. Hence, the state of Michigan could also assess the following taxes, penalties, and interest:

| | |
|---|---|
| Taxes that should have been withheld | $5,641.68 |
| Penalties (through Jul. 1, 1997) | 2,686.87 |
| Interest (through Jul. 1, 1997) | 490.42 |
| State Unemployment Tax | 2,821.51 |
| Penalty - Failure to File MESC 1017 | 715.00 |
| Penalty - Failure to File MESC 1020 | 88.79 |
| Interest on MESC Tax (through Jul. 1, 1997) | 298.63 |
| TOTAL STATE ASSESSMENTS | $12,742.90 |

Because the IRS determined that Handy Man, Inc.'s workers are employees, not subcontractors, his labor has substantially increased. Additionally, Handy Man, Inc. now has to pay for workman's compensation insurance for its employees. Assuming that Handy Man, Inc.'s business increases 20% the total labor will be $153,864.00 in 1997.

Below are the extra costs Handy Man, Inc. must incur for labor in 1997:

| | |
|---|---:|
| Matching FICA (7.65%) | $11,770.60 |
| Federal Unemployment Tax (.8% × $77,000.00) | 616.00 |
| State Unemployment Tax (2.7% × $104,500.00) | 2,821.50 |
| Workman's Compensation Insurance (5.56%) | 8,554.84 |
| TOTAL ADDITIONAL COSTS FOR EMPLOYEES INSTEAD OF SUBCONTRACTORS | 23,762.94 |
| EXTRA EXPENSES AS A PERCENTAGE OF LABOR | 15.40% |
| EXTRA EXPENSES AS A PERCENTAGE OF SALES | 8.09% |

EXAMPLE B

Jack Swan is a subcontractor and is responsible for his own taxes, including both halves of Social Security & Medicare Taxes (Self-Employment Tax—15.3% of his income). The Self-Employment tax is computed on the profit from the taxpayer's business income. Jack's wife, Jill does not work. When Jack gets his check from the contractor, he does not put aside the money every week to pay his taxes. He feels that he needs the money to work with and will be able to pay the taxes when they are due. Because he feels he cannot afford to pay a good accountant to do his bookkeeping he does not realize how much tax liability he is accumulating.

In April 1996, when his 1995 tax return is due, Jack's work is way down and he does not have the money to pay his taxes. So he does not have his tax return prepared, intending to have it done just as soon as his work picks back up and he has the money to pay the taxes.

Before Jack realizes it, June 1997 rolls around. Jack's 1995 return is still not filed. He receives a certified letter from the IRS notifying him that from the information they received from Jack's contractors, they have assessed taxes for 1995, and they intend to levy his bank accounts and process a lien on his home if he does not respond within ten days. Jack frantically contacts his accountant. Jack's accountant explains that when the IRS assesses a tax like this they do not take into consideration deductions and personal exemptions the taxpayer may be entitled to use. She advises Jack to get his information to her immediately so that she may prepare his return to put through a corrected liability and set up a payment plan. Jack gets his information to his accountant to have his 1995 & 1996 returns prepared.

Jack's tax liability for 1995, including penalties and interest computed through Jul. 1, 1997 is as follows:

| FEDERAL LIABILITY | |
|---|---:|
| Income Tax Liability | $979.00 |
| Self-Employment Tax Liability | 2,749.00 |
| Penalty - Failure to File | 839.00 |
| Penalty - Failure to Pay | 280.00 |
| Interest | 515.00 |
| TOTAL DUE ON 1995 FEDERAL RETURN | $5,362.00 |
| STATE LIABILITY | |
| Income Tax Liability | $632.00 |
| Penalty | 316.00 |
| Interest | 49.00 |
| TOTAL DUE ON 1995 STATE RETURN | $997.00 |
| TOTAL 1995 TAX LIABILITY | $6,359.00 |

Jack's tax liability for 1996, including penalties and interest computed through Jul. 1, 1997 is as follows:

| FEDERAL LIABILITY | |
|---|---:|
| Income Tax Liability | $1,196.00 |
| Self-Employment Tax Liability | 3,004.00 |
| Penalty - Failure to Make Estimated Payments | 220.00 |
| Penalty - Failure to File | 567.00 |
| Penalty - Failure to Pay | 63.00 |
| Interest | 90.00 |
| TOTAL DUE ON 1996 FEDERAL RETURN | %5,140.00 |
| STATE LIABILITY: | |
| Income Tax Liability | $724.00 |
| Penalty | 40.00 |
| Interest | 14.00 |
| TOTAL DUE ON 1996 STATE RETURN | $778.00 |
| TOTAL 1996 TAX LIABILITY | $5,918.00 |

Jack's total tax liability for 1995 & 1996, including penalties and interest computed through Jul. 1, 1997 is as follows:

| FEDERAL LIABILITY | |
|---|---:|
| Total 1995 Liability | $5,362.00 |
| Total 1996 Liability | 5,140.00 |
| TOTAL DUE ON FEDERAL RETURNS | $10,502.00 |
| STATE LIABILITY: | |
| Total 1995 Liability | $997.00 |
| Total 1996 Liability | 778.00 |
| TOTAL DUE ON STATE RETURNS | $1775.00 |
| TOTAL 1995 & 1996 TAX LIABILITY | $12,277.00 |

Jack also owes taxes on the income he has earned so far in 1997. Every week Jack owes taxes on what he is earning. Every day more interest & penalties are accumulating on the back taxes still unpaid!!

The following examples are levy notices processed by the IRS. The examples illustrate when a levy is processed on a taxpayer, how extensively penalties and interest magnify unpaid balances, which already include substantial penalties and interest. Penalties and interest will continue to accumulate until the entire balance is paid in full.

The IRS can require a business owner to turn over subcontract fees to the same extent as an employer can be required to turn over wages, or a bank can be required to turn over funds in checking and savings accounts.

There is also a copy of Publication 1494 (Table for Figuring Amount Exempt from Levy on Wages, Salary, and Other Income). All money owed to the taxpayer that is not exempt. MUST be sent to the IRS. Clearly, the amount exempt from levy is just barely enough for the taxpayer to live on.

The IRS has recently increased their efforts in examining whether those claimed as independent contractors are actually employees. The results of an adverse determination can be disastrous to a labor-intensive business. The examination usually covers two or three years and, in worst cases, the employer will be required to pay both halves of the social security (FICA), federal withholding, and unemployment (FUTA) taxes for those determined to be employees instead of independent contractors. In addition the re-classified employer will pay substantial penalties and interest.

The IRS has issued guidelines for employers to determine whether they have employees or independent contractors. The overriding question behind these guidelines is: How much control do you, the employer/payer, have over the worker?

Yes answers to the following indicate that a worker is an employee instead of a subcontractor:

1. Do you have the right to supervise and control the work being performed?
2. Do you have the right to discharge the worker for reasons other than breach of contract?
3. Do you pay by the hour or week instead of by the job being completed?
4. Is the work performed on your premises?
5. Is the worker performing the same type of work as your employees?
6. Do you furnish the tools or training necessary for the work to be performed?
7. Do you require the worker to submit regular reports or attend company meetings?

"Yes" answers to all of the following indicate that a worker is an independent contractor instead of an employee:

1. Is there a written contract between you and the worker?
2. Does the worker have the right to hire and fire assistants?
3. Does the worker have the right to delegate work to his own employees?
4. Is the worker considered a "skilled" worker?
5. Does the worker control his own hours?

Form 1099-MISC

In general, you are required to issue a 1099-MISC to any person (other than a corporation) that you pay for services or rents. The 1099-MISC needs to be sent to each person by January 31, xxxx, and to the IRS by Feb. 28, xxxx (for the year vvvv).

Form W-9

You will need to know the address and taxpayer identification (social security or employer identification) number of each payee in order to properly file the 1099-MISC. The IRS has provided Form W-9 to accomplish this. Form W-9 requires the payee to give their address, taxpayer identification number and signature. This form is required of all payees and should be returned to you. You maintain this form for your records and do not file it with the IRS. Attached is a Form W-9 which can be duplicated.

Back-Up Withholding

If the payee does not give you their taxpayer identification number or they give you an incorrect number, they are subject to "back-up" withholding of twenty percent of payments due to the payee. This twenty percent withholding must be remitted to the IRS.

If you think that your independent contractors are in fact employees, please call us so that they can be accounted for properly by starting regular withholding of taxes. However, if you have true independent contractors and do not want to fall prey to examination, please call us so that we can take steps to help insure that they qualify as such.

It is evident that many alternatives, modifications, and variations of the tax escrow system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A method for ensuring that an independent contractor service provider that performs services for a contracting entity preserves independent contractor status and has funds available to pay a taxing authority for a current tax year, the method comprising:

retaining a third-party escrow manager by a contracting entity;

providing services to the contracting entity by the independent service provider;

submitting tax-related data by the independent service provider to the third party escrow manager, the tax-related data including income and expense data for services of the independent contractor unrelated to the contracting entity;

processing the tax related data with a computer, to estimate taxes that the independent service provider owes the taxing authority;

deducting a portion of monies due the independent service provider by the contracting entity and retaining the portion of the monies in an escrow account; and submitting payment to the taxing authority in a timely manner of at least some of the monies in the escrow account retained from the independent service provider, without substantially affecting any tax liability that the contracting entity owes the taxing authority for the current tax year except for fees that may be paid to the escrow manager.

2. A method for ensuring that an independent contractor service provider that performs services for a contracting entity has funds available to pay a taxing authority for a current tax year, the method comprising:

retaining a third-party escrow manager by a contracting entity;

providing services to the contracting entity by the independent service provider;

submitting tax-related data by the independent service provider to the third party escrow manager, the tax-related data including income and expense data for services of the independent contractor unrelated to the contracting entity;

processing the tax related data with a computer, to estimate taxes that the independent service provider owes the taxing authority;

deducting a portion of monies due the independent service provider by the contracting entity and retaining the portion of the monies in an escrow account; and submitting payment to the taxing authority in a timely manner of at least some of the monies in the escrow account retained from the independent service provider for the current tax year, while preserving independent contractor status of the independent service provider and contractor status of the contracting entity.

* * * * *